(12) United States Patent
Schuster

(10) Patent No.: US 6,597,521 B2
(45) Date of Patent: Jul. 22, 2003

(54) OPTICAL UNIT AND METHOD FOR MAKING THE SAME

(75) Inventor: Karl-Heinz Schuster, Königsbronn (DE)

(73) Assignee: Carl-Zeiss-Stiftung, Heidenheim-Brenz (DE)

(*) Notice: Subject to any disclaimer, the term of this patent is extended or adjusted under 35 U.S.C. 154(b) by 0 days.

(21) Appl. No.: 10/244,030

(22) Filed: Sep. 16, 2002

(65) Prior Publication Data

US 2003/0012893 A1 Jan. 16, 2003

Related U.S. Application Data

(62) Division of application No. 09/017,159, filed on Feb. 2, 1998, now Pat. No. 6,451,462.

(30) Foreign Application Priority Data

Feb. 10, 1997 (DE) .......................................... 197 04 936

(51) Int. Cl.[7] .................................................. G02B 3/08
(52) U.S. Cl. ........................ 359/741; 65/60.8; 451/42
(58) Field of Search ...................... 359/642, 793–795, 359/796, 741; 428/446, 448, 426, 428, 688, 686; 427/162, 164–165, 279; 65/60.1, 60.8, 61; 451/41–42

(56) References Cited

U.S. PATENT DOCUMENTS

| | | | |
|---|---|---|---|
| 2,512,257 A | 6/1950 | Pfund | 359/356 |
| 4,810,318 A | 3/1989 | Haisma et al. | 156/153 |
| 5,339,441 A | 8/1994 | Kardos et al. | 359/352 |
| 5,469,299 A | 11/1995 | Nagano | 359/661 |
| 5,742,439 A | 4/1998 | Schuster | 359/749 |
| 5,895,720 A * | 4/1999 | Bianchi et al. | 428/428 |
| 6,084,708 A * | 7/2000 | Schuster | 359/494 |
| 6,177,372 B1 | 1/2001 | Martin et al. | 501/40 |
| 6,417,974 B1 * | 7/2002 | Schuster | 359/754 |

FOREIGN PATENT DOCUMENTS

| | | |
|---|---|---|
| JP | 05 100102 | 4/1993 |
| JP | 06 186405 | 7/1994 |

* cited by examiner

Primary Examiner—Jordan M. Schwartz
(74) Attorney, Agent, or Firm—Walter Ottesen

(57) ABSTRACT

The invention is directed to an optical unit having elements (6, 7) which are juxtaposed without an air gap therebetween. The two elements (6, 7) are joined by wringing the same to each other. At least one element (7) is of crystalline material and has an amorphous inorganic layer (70) on the side thereof facing toward the other element (6). The invention is also directed to a method of preparing an element made of crystalline material, such as a fluoride, as well as a method for making a thin optical element of the crystalline material.

4 Claims, 1 Drawing Sheet

OPTICAL UNIT AND METHOD FOR MAKING THE SAME

This is a Divisional of patent application Ser. No. 09/017,159 filed Feb. 2, 1998 now U.S. Pat. No. 6,451,462.

FIELD OF THE INVENTION

The invention relates to an optical unit having elements which lie one next to the other without an air gap therebetween. This joining technique is characterized as "wringing" or as "physical glue". At least one element of the optical unit is made of crystalline material. The invention also relates to an optical system incorporating the optical unit. The invention further relates to methods of making the optical unit.

BACKGROUND OF THE INVENTION

Wringing is widely used in optical manufacture as an alternative to cementing. However, as a joining technique for crystal, wringing is effective only to a limited extent especially where the elements of the unit have arcuate surfaces. It is at these surfaces, that microscopic steps are formed at the transitions between crystalline planes. A generally low adhesion occurs where the glass elements are made of fluorides.

Crystals and especially fluorides, such as $CaF_2$, $MgF_2$ and NaF, are required for ultraviolet optics such as for the deep ultraviolet range below a wavelength of 250 nm. These crystals are needed because they belong to those materials which are transparent in this wavelength range and which are photochemically stable and they can supplement quartz glass with their other optical characteristics such as for achromatization. Double refracting characteristics are also of significance.

Cementing cannot be used as a joining technique for this wavelength range because all these organic adhesive substances are not resistant to ultraviolet radiation.

SUMMARY OF THE INVENTION

It is an object of the invention to provide a technique for joining crystalline material without an intermediate air gap and without cement and to also provide optical units, systems and methods of manufacture with this technique.

The optical unit of the invention includes: a first optical element made of crystalline material; a second optical element; the first and second optical elements being mutually adjacent and conjointly defining an interface therebetween devoid of an air gap; the first optical element having a surface facing toward the second optical element at the interface; and, the first optical element having an amorphous inorganic layer formed on the surface in the interface.

According to a feature of the invention, the crystalline material is a fluoride. This is especially advantageous because, with this material, wringing is especially difficult and weak.

According to another feature of the invention, the amorphous inorganic layer is made of quartz glass and this material is suitable, inter alia, because of its ultraviolet transparency and resistance to ultraviolet light.

In this way, an achromatic unit suitable for deep ultraviolet light can be assembled using quartz glass and calcium fluoride with the optical elements being wrung to each other. The two optical elements can be made of different materials. The optical unit of the invention can be used with an ultraviolet light source and especially with a deep ultraviolet light source.

In an embodiment of the method of the invention, the element made of crystalline material such as fluoride is prepared for wringing. This is done by applying an inorganic amorphous layer to the wringing surface. The inorganic amorphous layer can, for example, be made of quartz glass. The method of applying the layer is not important as numerous methods are suitable for this purpose. Excellent adhesion and a smooth surface results, for example, from sputtering.

As may be required, the surface of the layer made of crystalline material can be smoothed, for example, by polishing, tempering, applying ion radiation or chemical polishing.

The method of the invention is for making a thin optical element of crystalline material having a predetermined diameter and a thickness of less than 5 mm or less than 5% of the diameter. The thin optical element is formed from an unfinished piece made of the crystalline material and the unfinished piece has first and second surfaces lying opposite each other. The method includes the steps of: placing the unfinished piece of the crystalline material on a support; optically machining the first surface of the unfinished piece to the final form thereof; applying an amorphous inorganic layer to the first surface to define a coated first surface; wringing the unfinished piece to a lens holder of a polishing machine with the coated first surface being in adhering wrung contact engagement with the holder; and, optically machining the second surface to the final form thereof.

In the above method embodiment, the production of optical parts made of crystal, which, in use, do not remain wrung to another part, also affords advantages.

These advantages include that a partially processed piece made of crystal must not be cemented to a lens carrier in order to polish an opposite-lying end. Instead, the partially-processed piece can be wrung to another element after applying the coating according to a feature of the invention. Cement is therefore unnecessary. In lieu of being wrung to a lens carrier, especially thin elements can be wrung directly to a further optical component to which they remain connected during use.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
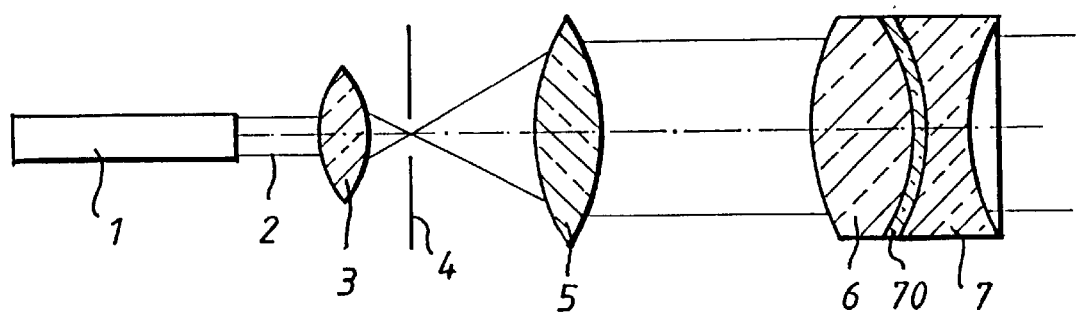
FIG. 1 is a schematic of an optical system which includes an achromatic unit having an element made of crystal which has a coating; and, FIG. 2 is a schematic of an optical polishing machine showing a coated crystal part during polishing with the crystal part being wrung to a lens holder.

The optical system shown in FIG. 1 includes a light source 1 which is preferably an excimer laser. The light source emits a light beam 2 having a wavelength in the deep ultraviolet range such as 248 nm, 193 nm or 157 nm.

Lenses 3 and 5 together with diaphragm 4 conjointly define a beam expanding unit. The lenses 6 and 7 are juxtaposed without air therebetween. More specifically, the lenses 6 and 7 are wrung together and conjointly define an achromatic unit. The lens 6 is made of quartz glass and the lens 7 is made of crystalline material, for example, a fluoride such as $CaF_2$, $MgF_2$ or NaF. These materials can be used in the deep ultraviolet range.

Normal wringing of the crystal lens 7 to the quartz lens 6 is, in principle, possible but not practical and not stable. A connection using optical adhesive (namely, an organic adhesive) cannot be used because these materials afford no chemical stability against deep ultraviolet radiation.

Wringing is possible without difficulty and is very stable because of the thin quartz layer 70 applied to the lens 7 in accordance with the invention. The quartz layer 70 is shown larger than actual size for the purposes of illustration. The thin layer 70 has no optical effect because the material thereof corresponds to the material of the lens 6.

The optical system can, for example, be part of a microlithographic projection exposure apparatus.

Optical elements made of crystalline material are, in addition to achromatization, suitable also for polarizing-optical elements because of their double-refracting characteristics. For this purpose, preferably thin planar plates are suitable in use because of stability reasons. They are also suitable already during manufacture because they can be wrung to massive planar plates, made, for example, from quartz glass or calcium fluoride when they are coated in accordance with the invention.

In this way, thin optical elements made of crystalline material can be produced with thicknesses down into the micrometer range.

Figure 2:
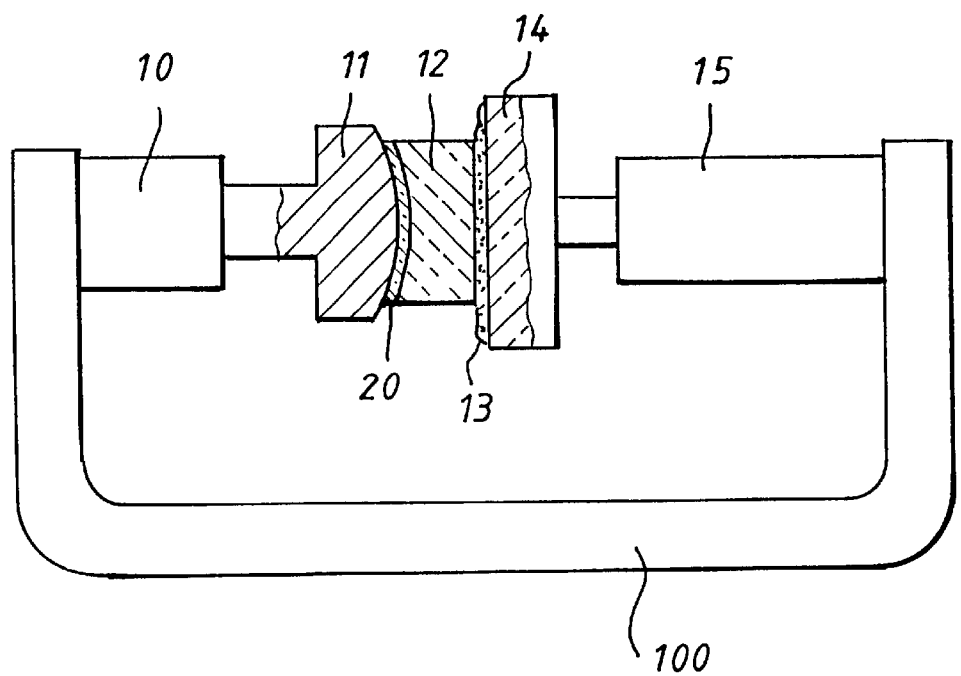

The processing of a wrung optical crystal part 12 having a layer 20 is shown in FIG. 2. The crystal part 12 is wrung to a lens carrier 11 which is mounted in a holder 10 (possibly having a rotational drive) of the lens polishing or grinding machine 100. The free surface of the crystalline part 12 is polished with polishing means 13 utilizing the polishing tool 14 which, in turn, is rotated by the drive 15.

The lens carrier 11 can already include a usable lens on which the crystal part 12 remains even permanently. Otherwise, the crystal part 12 is again removed after machining is completed.

The thin layer 20 can be applied utilizing all known techniques of manufacturing thin layers and can be subsequently treated. The sputtering of $SiO_2$ on $MgF_2$ has been successful and this results in a good adhering layer having an excellent smoothing effect.

The thin layer 20 can also be made of the same material but in amorphic form as the crystal part 12. The adhesion is then not improved but the smoothing is effective. In this case, the layer can be generated by converting the surface zone utilizing layer remelting, for example.

It is understood that the foregoing description is that of the preferred embodiments of the invention and that various changes and modifications may be made thereto without departing from the spirit and scope of the invention as defined in the appended claims.

What is claimed is:

1. A method for making a thin optical element of crystalline material having a predetermined diameter and a thickness of less than 5 mm or less than 5% of said diameter, the thin optical element being formed from an unfinished piece made of said crystalline material and said unfinished piece having first and second surfaces lying opposite each other, the method comprising the steps of:

placing said unfinished piece of said crystalline material on a support;

optically machining said first surface of said unfinished piece to the final form thereof;

applying an amorphous inorganic layer to said first surface to define a coated first surface;

wringing said unfinished piece to a lens holder of a polishing machine with said coated first surface being in adhering wrung contact engagement with said holder; and, optically machining said second surface to the final form thereof.

2. The method of claim 1, wherein said crystalline material is a fluoride.

3. The method of claim 1, wherein said amorphous inorganic layer is made of quartz glass.

4. The method of claim 1, wherein said layer is smoothed.

* * * * *